United States Patent [19]

Matsuda et al.

[11] Patent Number: 4,543,079
[45] Date of Patent: Sep. 24, 1985

[54] DEVICE FOR AUTOMATICALLY ADJUSTING TENSION OF ENDLESS RUNNING MEMBER IN WRAPPING CONNECTOR DRIVING

[75] Inventors: Yoshiaki Matsuda; Yoshimitsu Oohashi; Keiichi Sanpei; Yoshifumi Nagamine, all of Sakai, Japan

[73] Assignee: Kubota Ltd., Osaka, Japan

[21] Appl. No.: 654,523

[22] Filed: Sep. 25, 1984

Related U.S. Application Data

[63] Continuation of Ser. No. 552,012, Nov. 16, 1983, abandoned, which is a continuation of Ser. No. 200,340, Oct. 24, 1980, abandoned.

[30] Foreign Application Priority Data

Dec. 19, 1979 [JP] Japan .............. 54-176955[U]

[51] Int. Cl.⁴ ............................................. F16H 7/08
[52] U.S. Cl. ................................... 474/111; 474/110
[58] Field of Search ............... 74/467; 92/79; 184/6.24; 188/281, 352; 474/104, 110, 111, 140, 144

[56] References Cited

U.S. PATENT DOCUMENTS

| | | | |
|---|---|---|---|
| 1,579,681 | 4/1926 | Weller | 474/111 |
| 1,617,020 | 2/1927 | Merwin | 188/352 |
| 1,623,728 | 4/1927 | Hooten | 184/6.24 |
| 1,760,070 | 5/1930 | Kinsella | 92/79 |
| 2,893,255 | 7/1959 | Bayliss | 474/111 |
| 2,963,918 | 12/1960 | Blakstad | 474/111 |
| 3,347,341 | 10/1967 | Avrea | 74/606 R |
| 3,455,178 | 7/1969 | Ruoff et al. | 474/111 |
| 3,960,026 | 6/1976 | Hibino | 474/111 |
| 3,964,331 | 6/1976 | Oldfield | 474/111 |
| 4,190,025 | 2/1980 | Wahl | 474/110 |

FOREIGN PATENT DOCUMENTS

| | | | |
|---|---|---|---|
| 849938 | 9/1952 | Fed. Rep. of Germany | 474/110 |
| 46-28575 | 8/1971 | Japan | 474/110 |
| 511064 | 8/1939 | United Kingdom | 474/111 |
| 1214782 | 12/1970 | United Kingdom | 74/467 |

*Primary Examiner*—Lawrence J. Staab
*Attorney, Agent, or Firm*—Armstrong, Nikaido, Marmelstein & Kubovcik

[57] ABSTRACT

In a wrapping connector driving apparatus for agricultural machines including a chain reeved around sprocket wheels on two shafts, a tension adjusting device is provided on the slack side of the chain. A tightener bearing against the chain tensions the chain. A piston slidably fitting in an oil enclosing cylinder is pressed against the tightener by a resilient member. An abnormal load, when acting on the chain, is absorbed by the resilient member and the oil enclosed in the cylinder, which is provided with a passageway for releasing the increased internal pressure due to the abnormal load. When relieved of the load, the cylinder can be supplied with oil by way of a check valve. The tension on the chain is thus automatically adjustable.

9 Claims, 10 Drawing Figures

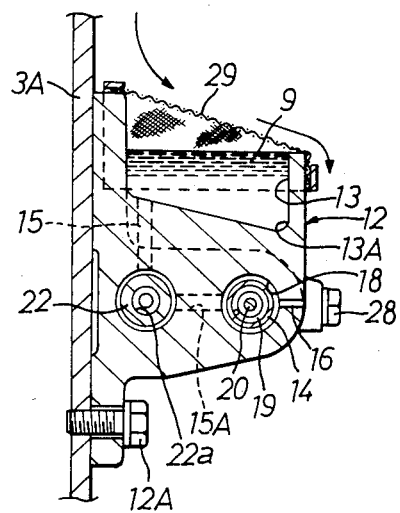
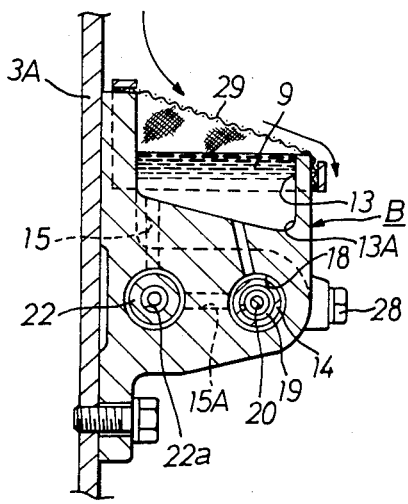

DEVICE FOR AUTOMATICALLY ADJUSTING TENSION OF ENDLESS RUNNING MEMBER IN WRAPPING CONNECTOR DRIVING

This application is a continuation of application Ser. No. 552,012, filed Nov. 16, 1983 now abandoned, which in turn is a continuation of 200,340 filed on Oct. 24, 1980, now abandoned.

BACKGROUND OF THE INVENTION

Wrapping connector driving apparatus are used for agricultural machines, such as rotary cultivators, elevator-type trenchers and crop diggers, and pasture handling machines including hay tedders, foliage harvesters, etc.

Wrapping connector driving apparatus have incorporated therein a device for adjusting the tension on an endless running member to assure proper and smooth power transmission. Such tension adjusting devices heretofore known are usually of the screw adjusting type, comprising a tightener pivotably supported in contact with the running member, a pressing member biased into pressing contact with the tightener by a resilient member, and an adjusting bolt for adjusting the force of the resilient member.

With the device of the screw adjusting type, the resilient member for biasing the pressing member becomes deteriorated while being repeatedly subjected to compression due to abnormal tension abruptly acting on the endless running member and to expansion due to the slackening of the running member. Accordingly the device is cumbersome to handle because of the necessity for the readjustment of the adjusting bolt as by tightening. Especially a great load, when acting abruptly on the device during operation, will not always be absorbed by the resilient member, possibly leading to a malfunction of the wrapping connector driving apparatus.

SUMMARY OF THE INVENTION

The present invention relates to a device for adjusting the tension on the endless running member of a wrapping connector driving apparatus for agricultural machines in which hydraulic means comprising a cylinder and a piston fitting in the cylinder is used for pressing a tightener to automatically adjust the tension.

An object of this invention is to provide an automatic tension adjusting device which includes a cylinder, a piston fitting in the cylinder and biased to press a tightener, an oil channel for supplying oil to the cylinder by way of a check valve, and an oil escape passageway for relieving the cylinder of an increased internal pressure due to an impact acting on the piston through the tightener and by which an abrupt load on the endless running member can be absorbed effectively without necessitating adjustment of the tension on the running member during operation.

Another object of this invention is to provide an automatic tension adjusting device of the construction described above in which the oil channel for supplying oil to the cylinder by way of a check valve is in communication with an oil well disposed at a location for receiving lubricant entrained by and released from the endless running member and which is thereby made operable without necessitating the replenishment of oil for a prolonged period of time.

Another object of the invention is to provide an automatic tension adjusting device of the foregoing construction in which the oil well is provided with a settling portion and/or a filter for removing foreign matter from the oil to be supplied from the oil well to the cylinder through the oil channel to render the piston movable free of any trouble.

Still another object of the invention is to provide an automatic tension adjusting device of the foregoing construction in which the cylinder, piston, check valve and oil well are provided in a single unit block formed with the oil supply channel and oil escape passageway to render the device easily installable in a limited space within the wrapping connector driving apparatus and also easy to maintain.

Other objects and advantages of this invention will become apparent from the following description with reference to the accompanying drawings.

BRIEF DESCRIPTION OF THE DRAWINGS

FIG. 9 is a view in section taken along the line 9—9 in FIG. 7; and

FIG. 10 is a sectional view corresponding to FIG. 9 and showing a modification.

DETAILED DESCRIPTION OF THE INVENTION

Figure 1:
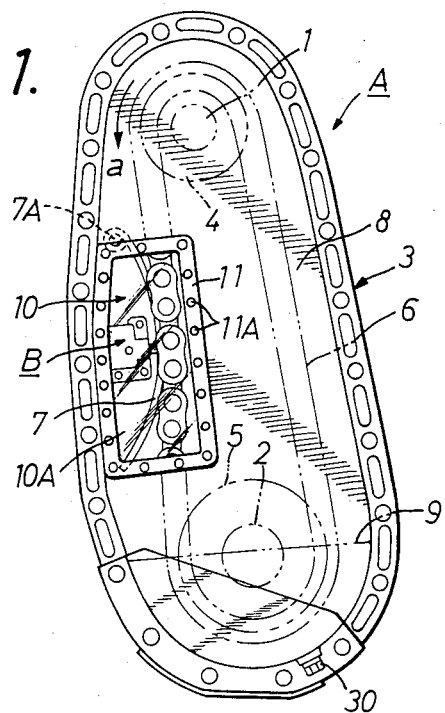
FIG. 1 is an overall front view showing a wrapping connector driving apparatus having incorporated therein a device of this invention.

FIG. 1 shows a wrapping connector driving apparatus A in its entirety which has incorporated therein an automatic tension adjusting device B. The apparatus A comprises a first shaft 1 serving as a drive shaft and a second shaft 2 as a driven shaft which are spaced apart by a specified distance and which are rotatably supported by unillustrated bearings on a transmission case 3. Sprocket wheels 4 and 5 are fixedly mounted on the shafts 1 and 2, respectively, within the case 3. An endless running member 6, e.g. a chain, is reeved around the sprocket wheels. The automatic tension adjusting device B is disposed on the slack side of the running member 6.

Figure 4:
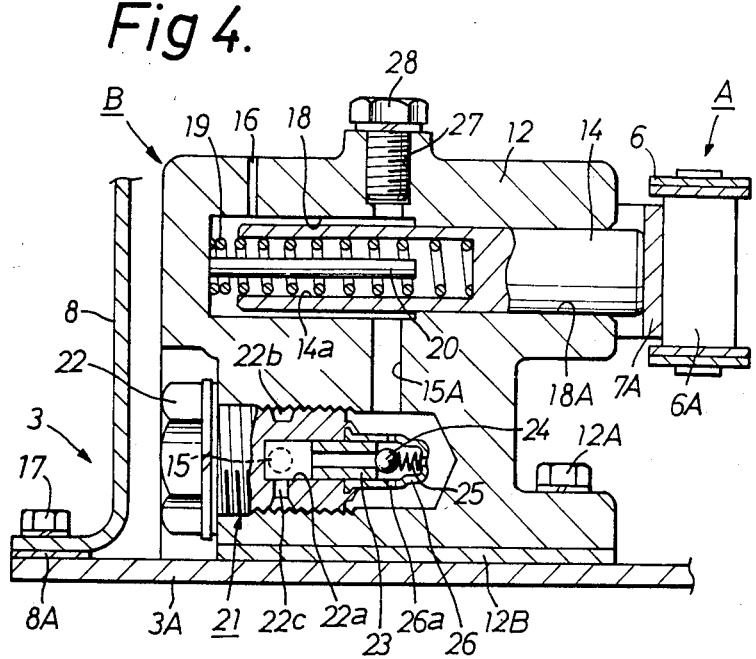
FIG. 4 is an enlarged view in section taken along the line 4—4 in FIG. 2.

The transmission case 3 comprises a base plate 3A and a cover 8 which are fastened together with bolts 17 with a seal 8A interposed between the fitting portions thereof (see FIG. 4). Lubricant 9 is placed in the case 3 to a specified level as seen in FIG. 1.

The endless running member 6 is driven in circulation in the direction of an arrow a to operatively connect the first shaft 1 to the second shaft 2. When the apparatus A is used for a rotary cultivator (either as the center drive type or side drive type although illustrated as the side drive type), a shaft having a number of tines is detachably connected between the second shaft 2 and another shaft in alignment with the shaft 2 for cultivation. The tine shaft may be replaced by the shaft of a screw rotor or drum rotor. Alternatively the apparatus A is usable as a transmission means for various other agricultural machines, such as crop diggers, hay tedders and foliage harvesters, as mentioned above.

With the present embodiment, the endless running member 6 is provided on its slack side with a tightener 7, through which the running member 6 is tensioned by the adjusting device B. As seen in FIG. 1, inspection means 10 is attached to the cover 8 of the transmission case 3 in opposed relation to the device B for the user to check from outside the device B for operation and the tightener 7 for behavior. The inspection means 10 comprises a frame 11 attached to the peripheral edge of an opening formed in the cover 8 and a transparent resin plate 10A fitted in the frame 11. The frame 11 is detachably fastened to the cover 8 with bolts 11A.

The tightener 7 bearing against the slack portion of the endless running member 6 is in the form of a strip having one end supported by a pivot 7A and extending in an arcuate form alongside the running member. In the illustrated embodiment, the tightener 7 is in contact with rollers 6A of the running member 6 as seen in FIGS. 3 and 4.

Figure 2:
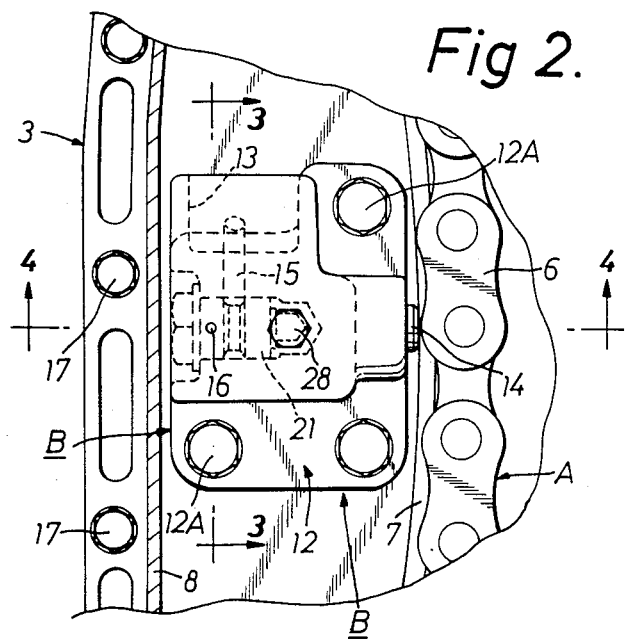
FIG. 2 is a front view partly broken away and showing an automatic tension adjusting device embodying the invention.
Figure 3:
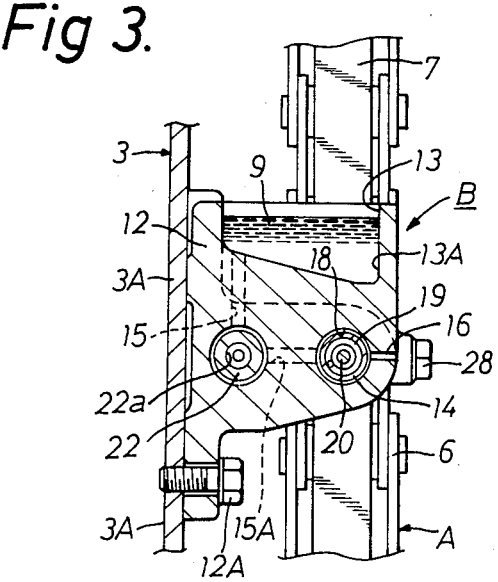
FIG. 3 is a view in section taken along the line 3—3 in FIG. 2.

As shown in FIGS. 2 to 4, the device B for biasing the tightener 7 to tension the endless running member 6 is detachably fastened to the base plate 3A of the transmission case 3 with bolts 12A, preferably with a seal 12B provided between the fitting portions of the base plate 3A and the device B.

The device B includes a unit block 12 provided with a cylinder 18 and a piston 14 slidably fitting in the piston. The piston 14 is opposed to the tightener 7 and biased toward the tightener by a resilient member 19. As seen in FIG. 4, the piston 14 has an accommodating portion 14a, in which the resilient member 19 in the form of a coil spring is housed in bearing contact with the bottom of the cylinder 18 and the bottom of the portion 14a to bias the piston 14 toward the tightener 7, causing the tightener 7 to tension the endless running member 6.

The cylinder 18 has an inside diameter slightly larger than the outside diameter of the piston 14 and is adapted to enclose oil in its entire interior including the accommodating portion 14a. The cylinder 18 is provided with a portion 18A for guiding the piston 14. To prevent air from remaining in the oil enclosed in the cylinder 18, the cylinder 18 has a projection 20 extending coaxially therewith into the center of the accommodating portion 14a.

With the unit block 12 fixedly mounted on the base plate 3A with the bolts 12A, the piston 14 is opposed to the tightener 7. As best seen in FIG. 3, an oil well 13 is formed in the top portion of the unit block 12. The oil well 13 has a slanting bottom wall to provide a settling portion 13A at the deepest bottom part. The oil well 13 is disposed at a location where the lubricant entrained by the running member 6 in circulation is released therefrom, whereby the oil well 13 can be replenished with the oil placed in the transmission case 3.

The oil well 13 is in communication with the cylinder 18 through oil supply channels 15 and 15A formed in the unit block 12. The oil channel 15 is in communication with the oil well 13, while the other oil channel 15A is in communication with the cylinder 18 as shown in FIG. 3. A check valve 21 is provided between the two oil channels 15 and 15A. As shown in FIG. 4, the check valve 21 comprises a screw plug 22 screwed in the block 12 in parallel with the cylinder 18, a sleeve 23 fitted in an oil passage 22a formed in the plug 22 coaxially therewith, and a ball 24 disposed at the forward end of the sleeve 23 and biased by a spring 25. The check valve 21, substantially the ball 24, is operable under a pressure of 3 to 4 kg/cm$^2$. The screw plug 22 is formed in the outer periphery of its shank with a circumferential groove 22b in communication with the oil channel 15. The groove 22b communicates with the oil passage 22a through a radial bore 22c. A hat-shaped spring support 26 surrounding the sleeve 23, ball 24 and spring 25 is secured to the plug 22 as by caulking. The spring support 26 has bores 26a communicating with the oil channels 15A.

Figure 5:
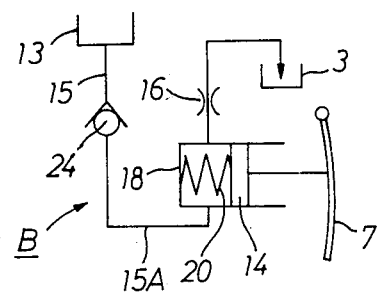
FIG. 5 is a diagram schematically showing the automatic tension adjusting device in its entirety.

The check valve 21 prevents reverse flow of oil when the internal pressure of the cylinder 18 builds up owing to an impact acting on the piston 14 through the tightener 7. The increase in the cylinder internal pressure is absorbed by the compression of the oil and also by an oil escape passageway 16 which, in the embodiment shown in FIGS. 3 and 5, holds the interior of the cylinder 18 in communication with the interior of the transmission case 3. The oil escape passageway functions substantially as a throttle valve and has throttling resistance greater than the force of the spring 25 in the check valve 21.

After the interior of the unit block 12 including the oil well 13 and the cylinder 18 has been charged with piston operating oil, the piston 14 is fitted into the cylinder 18 along with the resilient member 19. To prevent air from remaining in the oil at this time, the oil channel 15A is formed with a threaded bore 27 for releasing air therethrough. After the oil has been charged in, the threaded bore 27 is closed with a plug 28, whereby the oil is enclosed in the cylinder 18. The resilient member 19 and the oil in the cylinder cooperate to press the piston 14 against the tightener under a load of 6 to 9 kg.

While the wrapping connector driving apparatus A is in operation, the endless running member 6 is under specified tension. An abnormal load, when acting on the second shaft 2 for a moment during operation, tensions the slack side of the running member 6, and the force is delivered to the piston 14 through the tightener 7. The piston 14, which is biased by the resilient member 19 and functions as an oil damper with the oil enclosed in the cylinder 18, absorbs and mitigates the momentary impact. When the internal pressure of the cylinder 18 builds up, the oil escape passageway 16 releases the increased pressure.

In this way, the momentary load or impact during operation is released effectively, whereupon the piston 14, which is biased by the resilient member 19, slidingly advances toward the tightener 7, causing the cylinder 18 to act as a suction pump. With the ball 24 moved to open the check valve 21, oil is supplied from the oil well 13 to the cylinder 18 through the oil channels 15, 15A. Since the oil entrained by the endless running member 6 in circulation can be stored in the oil well 13, the tension on the running member 6 is automatically adjustable to the set value.

When the piston 14 fitting in the cylinder 18 performs a pumping action, air would enter the cylinder 18 through the high pressure releasing means, namely escape passageway 16, but the relief means 16 impedes the flow of air, thus substantially eliminating the likelihood of air ingressing into the cylinder 18.

Figure 6:
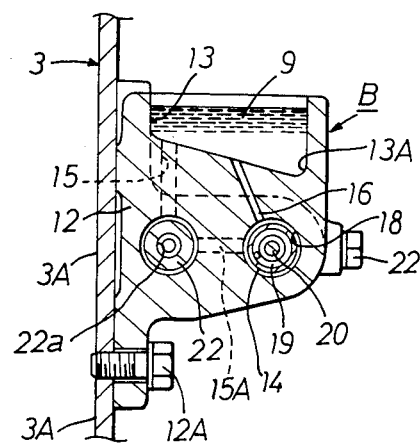
FIG. 6 is a sectional view corresponding to FIG. 3 and showing a modification.

To completely prevent the ingress of air, the relief means 16 is preferably in communication with the oil well 13 as shown in FIG. 6. With the exception of this feature, the modification of FIG. 6 has the same construction as the embodiment shown in FIG. 3, so that like parts are referred to by like reference numerals.

To prevent the inflow of air, the oil escape passageway 16 may alternatively be in the form of a helical passage having increased resistance, for example.

As illustrated in FIGS. 3 and 6, it is desired that one of the oil supply channels 15 and 15A for the cylinder 18, i.e. the channel 15, be in communication with the oil well 13 at a higher level than the settling portion 13A. If the lubricant is used also as the working oil for the piston in this case, the piston 14 is operable free of the trouble that would otherwise result from the presence of foreign matter in the lubricant. To assure this, the oil passageway 16 shown in FIG. 6 is in communication with the well 13 at a higher level than the settling portion 13A.

Figure 7:
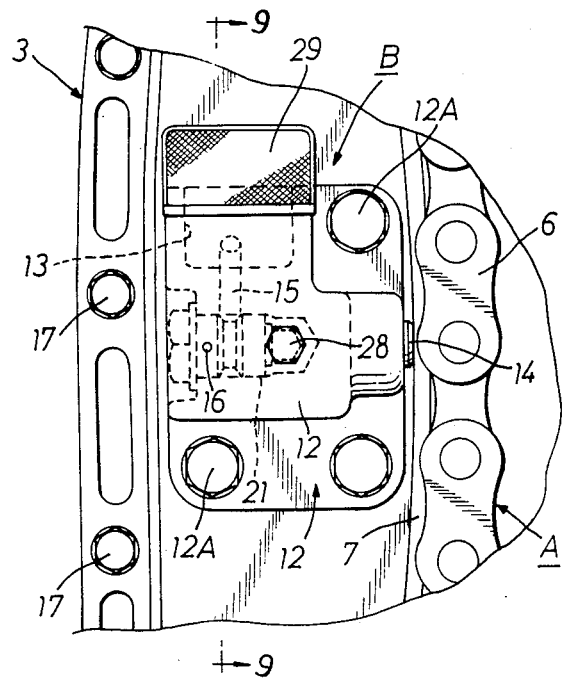
FIG. 7 is a front view showing another automatic tension adjusting device embodying the invention.
Figure 8:
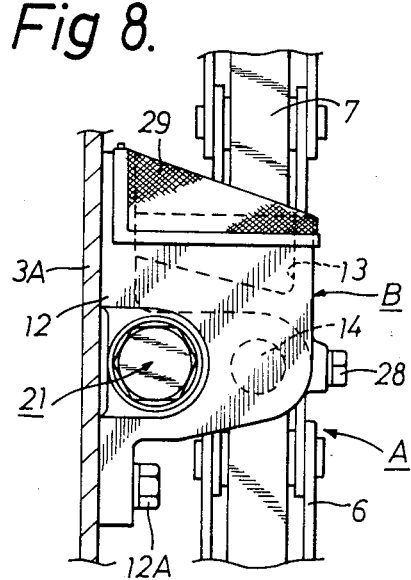
FIG. 8 is a side elevation of the same.

FIGS. 7 to 9 show another embodiment having the same construction as the first embodiment shown in FIGS. 2 to 4 except that a filter net 29 is detachably provided at an upper opening of the oil well 13, so that like parts are referred to by like reference numerals. FIG. 10 shows the same embodiment as shown in FIG. 6 except that the oil well 13 is detachably provided with a filter net 29 at its opening. These embodiments are advantageous in that foreign matter, such as iron particles, can be removed by the filter net 29 from the lubricant entrained by and released from the endless running member 6 to render the piston 14 operable with reduced trouble or failure.

When provided with the filter net 29, the oil well 13 may have a bottom of uniform depth. The filter net 29 and the settling portion 13A constitute means for collecting foreign matter to protect the cylinder from the foreign matter.

Although the foreign matter collecting means may consist only of the filter net or the settling portion, the filter net, when singly used, is unable to collect foreign matter smaller than its mesh size, so that it is advantageous to use the net in combination with the settling portion 13A as shown in FIGS. 7 to 10 to assure a double collecting function.

The transmission case 3 shown in FIG. 1 is replenished with lubricant through an unillustrated supply plug, while the oil can be discharged therefrom through a plug 30. Through the inspection means 10, the tightener 7 can be checked for the state of contact with the running member 6, and the piston 14 for the state of bearing contact with the tightener 7. Improper contact can be corrected after removing the inspection means 10.

Although apparent from the foregoing description, basic advantages of the invention are as follows.

The means for biasing the tightener into pressing contact with the running member comprises a cylinder and a piston fitting in the cylinder and biased by the cooperation of a resilient member and oil enclosed in the cylinder, with the result that an abrupt load, if acting on the piston through the tightener, can be absorbed by the oil damper action of the oil.

When the cylinder is relieved of the load, the piston functions as a suction pump, automatically supplying oil to the cylinder, so that the device retains a proper pressing force even when the resilient member has a reduced force.

The present device is easily and properly installable in existing wrapping connector driving apparatus.

The present device can be altered and modified without departing from the scope of the invention defined in the appended claims and is useful for rotary cultivators and various other agricultural machines.

For example, the device can be modified by applying a wear resistant material to the tightener for contact with the running member, or by eliminating the projection 20 from the cylinder, or by using a belt as the endless running member. A pair of endless running members may be provided side by side to carry conveying members at a predetermined spacing longitudinally thereof to afford an elevator-type conveyor, to which a tension adjusting device may be attached.

What is claimed is:

1. In a wrapping connector driving apparatus including an endless running member reeved around two rotatable shafts spaced apart by a specified distance, tensioning means disposed on the slack side of the running member for imparting tension to the running member by a tightener, and a transmission case housing the endless running member therein and containing at its lower portion oil so that the oil is entrained by the endless running member, a device for automatically adjusting the tension on the endless running member characterized by:

a main body of the adjusting device being attached to the transmission case and having at its upper portion an oil well for accommodating the oil entrained by the endless running member, the adjusting device main body being internally formed with a cylinder portion and having a piston slidably inserted in the cylinder portion and a resilient member causing the piston to press the tightener against the endless running member, the adjusting device main body being formed with an oil supply channel for supplying the oil from the oil well to the cylinder portion through a check valve and with an oil escape passageway for permitting the cylinder portion to communicate with the oil well and releasing the internal high pressure of the cylinder portion resulting from impact on the piston, the oil supply channel having a starting end in communication with a bottom portion of the oil well, the oil escape passageway having a terminal end in communication with a bottom portion of the oil well, the supply channel starting end being in communication with the oil well at a higher level than the escape passageway terminal end, the adjusting device main body being attached to the transmission case by bolts positioned at least above and below the cylinder portion toward the endless running member, the oil well being positioned at a larger distance away from the endless running member than the upper and lower attaching bolts.

2. A device as defined in claim 1, wherein the main body is formed in a unit block with the oil well formed as a cavity having an open upper portion and a bottom slanting in only one direction to provide at its deepest portion means for collecting foreign matter from the lubricating oil, the deepest portion being positioned in the plane of travel of the running member.

3. A device as defined in claim 2, wherein the oil supply channel starting end communicates with the shallowest bottom portion of the oil well which portion is away from the foreign matter collecting means.

4. A device as defined in claim 3, wherein the oil escape passageway is provided with throttle-relief means for relieving the cylinder of increased internal pressure due to an impact acting on the piston through the tightener, the throttle-relief means having throttle resistance greater than the force of the spring of the check valve.

5. A device as defined in claim 4, wherein the check valve and the piston are incorporated in the block and are arranged side-by-side below the cavity with the piston being positioned toward the deepest portion and the check valve toward the shallowest portion.

6. A device as defined in claim 5, wherein the transmission case is upright, and the bottom of the oil well is slanted from inside of the case toward the outside thereof, the throttle-relief means being in communication with an oil well bottom portion other than the deepest portion to provide a closed circuit.

7. A device as defined in claim 5 wherein the transmission case is upright, and the oil well is provided within the transmission case and has an upper opening equipped with a filter, the filter and the deepest portion of the oil well bottom providing double means for collecting foreign matter.

8. A device as defined in claim 5 or 6 wherein an oil channel for holding the outlet of the check valve in communication with the cylinder is formed in a unit block and further extends from the cylinder to provide an air release bore intersecting the axis of the piston at right angles thereto, the air release bore having a plug removeably screwed therein.

9. A device as defined in claim 5 or 6 wherein the unit block having the tensioning means is fixedly but removeably provided within the transmission case, and the transmission case is provided in its cover with inspection means in opposed relation to the unit block, the inspection means comprising an aperture larger than the unit block and a transparent plate removeably attached to the cover to close the aperture, the unit block being insertable into or removeable from the case through the aperture, a plug for an air release bore being opposed to the aperture.

* * * * *